United States Patent [19]

Bukhman et al.

[11] 4,023,177
[45] May 10, 1977

[54] AUTOMATIC RADIO COMPASS

[76] Inventors: Aron Borukhovich Bukhman, Khersonskaya ulitsa, 18, kv. 90; Igor Lvovich Yanushkevich, Angarskaya ulitsa, 49, korpus 2, kv. 93; Vadim Dmitrievich Kalashnikov, Leninsky prospekt, 85, korpus 6, kv. 65; Marina Isaakovna Levitina, 5 Monetchikovsky pereulok, 13, kv. 80; Jury Borisovich Rozenberg, Kirovogradskaya ulitsa, 10, korpus 2, kv. 165, all of Moscow; Vladimir Valentinovich Elkin, ulitsa semii, Shamshinykh, 37a, kv. 7, Novosibirsk; Elena Mikhailovna Ponomareva, Pyatnitskaya ulitsa 2, kv. 27, Moscow, all of U.S.S.R.

[22] Filed: Dec. 26, 1974

[21] Appl. No.: 536,445

Related U.S. Application Data

[63] Continuation of Ser. No. 445,154, Feb. 20, 1974, abandoned.

[52] U.S. Cl. .......................... 343/117 R; 343/120; 343/123
[51] Int. Cl.² ......................................... G01S 5/02
[58] Field of Search ................ 343/117 R, 120, 123

[56] References Cited

UNITED STATES PATENTS

| 3,156,916 | 11/1964 | Byatt | 343/117 R |
| 3,611,386 | 10/1971 | Perper | 343/120 |
| 3,701,155 | 10/1972 | Adams | 343/117 R |

*Primary Examiner*—Maynard R. Wilbur
*Assistant Examiner*—T. M. Blum

[57] ABSTRACT

An automatic radio compass intended as a navigation aid for use in sea- and aircraft and comprising a first antenna with a first receiver, a second antenna with a second receiver, an indicating means, and a unit common to both receivers and ensuring their noise immunity.

3 Claims, 2 Drawing Figures

AUTOMATIC RADIO COMPASS

This is a continuation of application Ser. No. 445,154, filed Feb. 20, 1974, now abandoned.

BACKGROUND OF THE INVENTION

The present invention relates to radiogoniometry, and more particularly to an automatic radio compass intended as a navigation aid for use in sea- and aircraft to direct them to the source of the signal whose bearings are taken, as well as a search-and-rescue aid.

DESCRIPTION OF THE PRIOR ART

An automatic radio compass is widely known, in which a first directional antenna, the radiation pattern whereof is reversible which has two equisignal reception directions in the process by the reversal, is intended for the reception and amplitude modulation with a low-frequency switching signal of the signal whose bearings are being taken and which is a high-frequency signal modulated with an audio-frequency signal, the depth of the amplitude modulation with the switching signal being dependent on the angle between the equisignal reception direction and the bearing to the point of origin of the signal whose bearings are being taken, and is electrically connected to the input of the first receiver having a channel in which the signal whose bearings are being taken is transformed and amplified. Such a compass further comprises a detector producing the modulating signals and having its output electrically connected to the input of the circuit controlling the rotation of the first antenna, the circuit producing a control signal corresponding to the amplitude and phase of the modulating low-frequency switching signal and intended to control the rotation of the first antenna by turning it until the equisignal reception direction coincides with the bearing to the source of the signal whose bearings are being taken.

A disadvantage inherent in the prior art automatic radio compass resides in its limited range in the reception of a continuous high-frequency signal, due to its low sensitivity and poor noise immunity, which is caused by the small effective length of the directional antenna and excessively large receiver bandwidth which is much greater than the bandwidth required for optimum conditions of producing modulating signals.

Another disadvantage of this automatic ratio compass is the impossibility of locating the sources of a signal which is in the form of a train of pulses with a high carrier frequency, the duration of the pulses being in keeping with the receiver bandwidth.

Still another disadvantage of the above prior art automatic ratio compass is that taking the bearings of a signal involves continuous monitoring of the modulating audio-frequency signal, which distracts the operator from performing other functions.

OBJECTS AND SUMMARY OF THE INVENTION

It is an object of the present invention to provide a sensitive long-range automatic radio compass with optimum conditions for producing modulating signals.

Another object of the invention is to provide an automatic radio compass which will enable the location of the sources of a signal in the form of a train of pulses with a high carrier frequency and having a duration which is in keeping with the receiver bandwidth.

Still another object of the invention is to provide an automatic radio compass with visual indication of the audio-frequency modulating signal during the reception of a continuous high-frequency signal, as well as a signal in the form of a train of pulses with a high carrier frequency.

With these and other objects in view, an automatic ratio compass is provided in which a first directional antenna, the radiation pattern whereof is reversible and has two equisignal reception directions in the process of the reversal, intended for the reception and amplitude modulation with a low-frequency switching signal of the signal whose bearings are being taken and which is a high-frequency signal modulated with an audio-frequency signal, the depth of the amplitude modulation with the switching signal being dependent on the angle between the equisignal reception direction and the bearing to the source of the signal whose bearings are being taken, is electrically connected to the input of a first receiver having a channel in which the signal whose bearings are being taken is transformed and amplified and a detector producing the modulating signals and having its output electrically connected to the input of a circuit controlling the rotation of the first antenna, which circuit produces a control signal corresponding to the amplitude and phase of the modulating low-frequency switching signal and is intended to control the rotation of the first antenna by turning it until the equisignal reception direction coincides with the bearing to the source of the signal whose bearings are being taken. The automatic radio compass also comprises, according to the invention, a second antenna, the effective length whereof is at least 25 times greater than that of the first antenna, a second receiver having a channel in which the signal whose bearings are being taken is transformed and amplified and a detector producing the modulating audio-frequency signal and having its output connected to an indicating means, and a unit common to the first and second receives for ensuring their noise immunity.

It is expedient to provide the automatic radio compass with a unit for ensuring the required noise immunity of the receivers in the case when the signal whose bearings are being taken is a continuous modulated high-frequency signal the duration whereof is at least equal to the response time of the first antenna rotation control circuit, said unit comprising a controlled local oscillator, a first mixer having one input connected to the output of the signal amplification and transformation channel of the second receiver and the other input connected to the first output of the controlled local oscillator, a second mixer having one input connected to the output of the signal amplification and transformation channel of the first receiver and the other input connected to the second output of the controlled local oscillator, a first narrow-band filter having a resonant frequency and a pass-band which is at least twice as great as the frequency of the low-frequency modulating signal, the input of the first narrow-band filter being connected to the output of the first mixer, a second narrow-band filter having a resonant frequency and a pass-band equal to those of the first narrow-band filter, the input of the second narrow-band filter being connected to the output of the second mixer, an amplitude detector converting the signal from the output of the first narrow-band filter into a d-c voltage and having its input connected to the first output of the first narrow-band filter, a frequency discriminator tuned to the resonant frequency of the first and second filters, for converting the difference between the frequency of the signal from the output of the first filter and the resonant frequency thereof into a d-c voltage, having its input connected to the second output of the first narrow-band filter and having its output connected to the first control input of the controlled local oscillator, the second control input whereof has connected thereto a local oscillator frequency control unit which varies said frequency stepwise within preset limits and the input whereof has connected thereto the output of a local oscillator frequency control unit stop circuit whose input is connected to the output of the amplitude detector and which fixes the voltage at the output of the local oscillator frequency control unit at the moment of arrival of the signal from the output of the amplitude detector, the output of the second narrow-band filter being connected to the input of the detector of the first receiver.

It is also expedient to provide the automatic radio compass with a unit for ensuring the required noise immunity of the receivers in the case when the signal whose bearings are being taken is in the form of a train of pulses with a high carrier frequency, the recurrence frequency of these pulses being at least twice as high as the frequency of the modulating low-frequency signal, and comprising an amplitude selector the input whereof is connected to the output of the detector of the second receiver, and a coincidence circuit, the first input whereof is connected to the output of the amplitude selector and the second input is connected to the output of the detector of the first receiver, said circuit being provided for gating the signals from the output of the detector of the first receiver with the train of pulses from the output of the amplitude selector and having its output connected to the input of the first antenna rotation control circuit, thereby ensuring the electric connection thereof to the output of the detector of the first receiver. The amplitude selector includes a first amplifier of the train of pulses together with noise, the first output whereof is connected to the input of an integrator which accumulates, at its output, a d-c voltage proportional to the average noise level, the second output of the first amplifier being connected to the first input of a signal difference producing circuit whose second input is connected to the output of the integrator and whose output is connected via a second amplifier to the input of a threshold circuit which produces at its output a train of pulses applied to the first input of the coincidence circuit.

The automatic radio compass of the present invention should preferably be provided with an indicating means comprising a first amplifier connected to the output of the detector of the second receiver for amplifying the modulating audio-frequency signal together with noise, a filter having a pass-band for ensuring the passage of the audio-frequency signal and having its input connected to the output of the first amplifier, a first integrator which accumulates, as its output, a d-c voltage proportional to the average noise level and has its input connected to the output of the first amplifier, a circuit for producing a difference between the d-c voltage at the output of the integrator and the signal at the filter output, the first and second inputs whereof have connected thereto the outputs of the first integrator and the filter, respectively, while its output is electrically coupled, via a second amplifier, to the input of a second integrator which accumulates, at its output, a d-c voltage proportional to the level of the signal at the output of the second amplifier and has its output connected to the input of a threshold circuit for lighting an indicator lamp as soon as the d-c voltage at the output of the second integrator exceeds the threshold voltage level, which is indicative of the presence of the signal whose bearings are being taken at the input of the automatic radio compass.

The employment of the proposed automatic radio compass as a navigation aid in sea- and aircraft permits a substantial increase in the efficiency of locating the source of the signal whose bearings are being taken, the time required to locate said source being drastically reduced, as well as permitting the use, as sources of signals whose bearings are taken by the proposed ratio compass, simple and cheap beacons sending signals in the form of trains of pulses with a radio frequency carrier.

The proposed automatic radio compass is also advantageous in that it is easy to manufacture.

BRIEF DESCRIPTION OF THE DRAWINGS

The invention will now be described in greater detail with reference to the preferred embodiments thereof, taken in conjunction with the accompanying drawings, wherein.

DETAILED DESCRIPTION OF THE PREFERRED EMBODIMENTS

Figure 1:
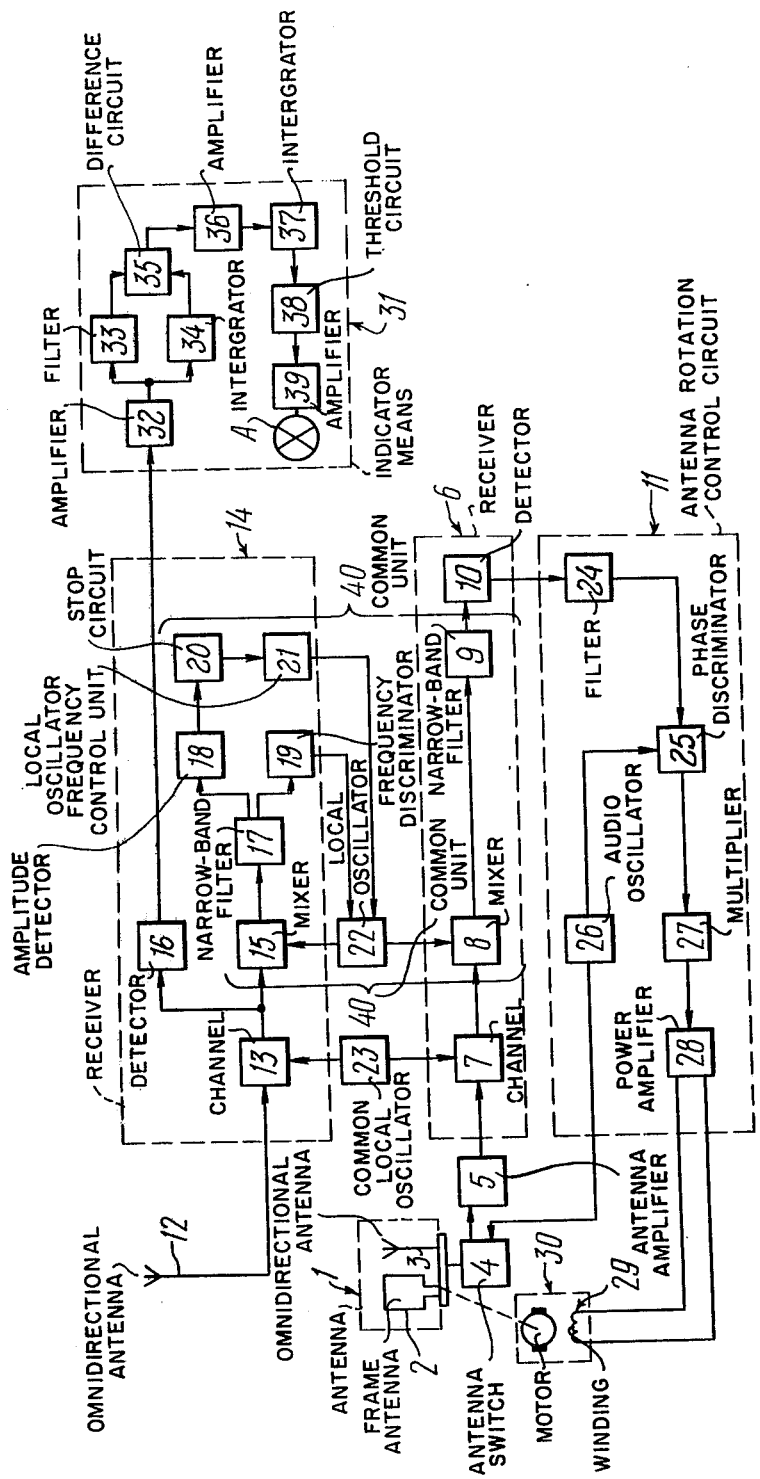
FIG. 1 is a block diagram of an embodiment of the proposed automatic radio compass provided with a unit for ensuring the required noise immunity thereof, and in indicating means.

Referring now to FIG. 1, the automatic radio compass comprises an antenna 1, the radiation pattern whereof is reversible and in the form of a cardioid made up of the radiation pattern of a frame antenna 2 and that of an omnidirectional antenna 3. The antenna 1 is connected to an antenna switch 4, the output whereof is electrically connected, via an antenna amplifier 5 using a conventional circuit and ensuring wide-band amplification of the signal whose bearings are being taken, to the input of a receiver 6 or, to be more precise, to the input of a channel 7 in which the signal whose bearings are being taken in transformed and amplified and which is comprised of a number of per se known signal transformation and amplification stages. The output of the channel 7 is coupled to the first input of a mixer 8 which comprises a conventional circuit and is built around a circuit element with nonlinear characteristics. The output of the mixer 8 is connected to the input of a narrow-band filter 9, a conventional circuit having a resonant frequency and a pass-band which is at least twice as high as the frequency of the modulating low-frequency signal. The narrow-band filter 9 has its output connected to the input of a detector 10 which produces modulating signals and uses a conventional amplitude detection circuit, the output of the detector 10 being coupled to the input of a circuuit 11 utilized for controlling the rotation of the antenna 1.

The automatic radio compass is also provided, according to the invention, with an onmidirectional antenna 12, the effective length whereof is at least 25 tines greater than that of the antenna 1, the antenna 12 being electrically connected to a channel 13, for transformation and amplification, of another receiver 14 including a mixer 15 which is a conventional circuit and has the first input thereof connected to the output of the channel 13 coupled, in turn, to the input of a detector 16 for producing a modulating audio-frequency signal. The receiver 14 also includes a narrow-band filter 17, a conventional circuit, the resonant frequency and the pass-bond whereof are the same as in the filter 9. The first input of the narrow-band filter 17 is connected to the input of an amplitude detector 18 employing a conventional amplitude detection circuit, while the second input of the narrow-band filter 17 is coupled to the input of a frequency discriminator 19 using a conventional circuit for conversion of a frequency difference into a d-c voltage. The output of the amplitude detector 18 is connected to the input of a stop circuit 20 which is a known threshold circuit and has its output connected to the input of a local oscillator frequency control unit 21 which uses a known sawtooth voltage generator built around multivibrators and ensures stepwise variation of the output voltage within preset limits. A controlled local oscillator 22, common to both receivers 6 and 14, has two control inputs, one being connected to the output of the frequency discriminator 19 and the other being connected to the output of the local oscillator frequency control unit 21. The first output of the controlled local oscillator 22 is connected to the second input of the mixer 15, while the second output of the local oscillator 22 is connected to the second input of the mixer 8. In addition, the channels 7 and 13 of the receivers 6 and 12, respectively, have a common local oscillator 23 owing to which the receivers 6 and 12 operate at the same intermediate frequency.

The antenna rotation control circuit 11 is provided with a filter 24 tuned to the first harmonic of the modulating low-frequency signal and comprising a conventional circuit, the output of the filter 24 being connected to the first input of a phase discriminator 25, also being a conventional circuit, the second input whereof has connected thereto the first output of an audio oscillator 26. The output of the phase discriminator 25 is coupled to the input of a multiplier 27 of the power signal and the signal from the output of the phase discriminator 25, while the output of the multiplier 27 is connected to the input of a power amplifier 28 whose output is connected to winding 29 for controlling a motor 30 which rotates the antenna 1, the motor 30 being mechanically associated with the latter. The second output of the audio oscillator 26 is connected to the input of the antenna switch 4.

Connected to the output of the detector 16 is an indicator means 31 including an amplifier 32 whose output is coupled to the input of a filter 33 the pass-band whereof ensures the passage of the audio-frequency signal. The same output of the amplifier 32 has connected thereto the input of an integrator 34, being a conventional circuit, the output whereof is connected to the first input of a circuit 35 for producing the difference between the constant voltage at the output of the integrator 34 and the signal at the output of the filter 33, with the output of the filter 33 being connected to the second input of the circuit 35. The output of the circuit 35 is conncted to the input of an amplifier 36, the output whereof is coupled to another integrator 37, also being a conventional circuit. The output of the integrator 37 is connected to the input of a threshold circuit 38 whose output is electrically connected, via an amplifier 39, to an indicator lamp A.

The mixers 8 and 15, controlled local oscillator 22, narrow-band filter 18, frequency discriminator 19, stop circuit 20 and local oscillator frequency control unit make up a unit 40 which is common to the receivers 6 and 14 and ensures their noise immunity in the case when the signal whose bearings are being taken in a continuous modulated high-frequency signal.

Figure 2:
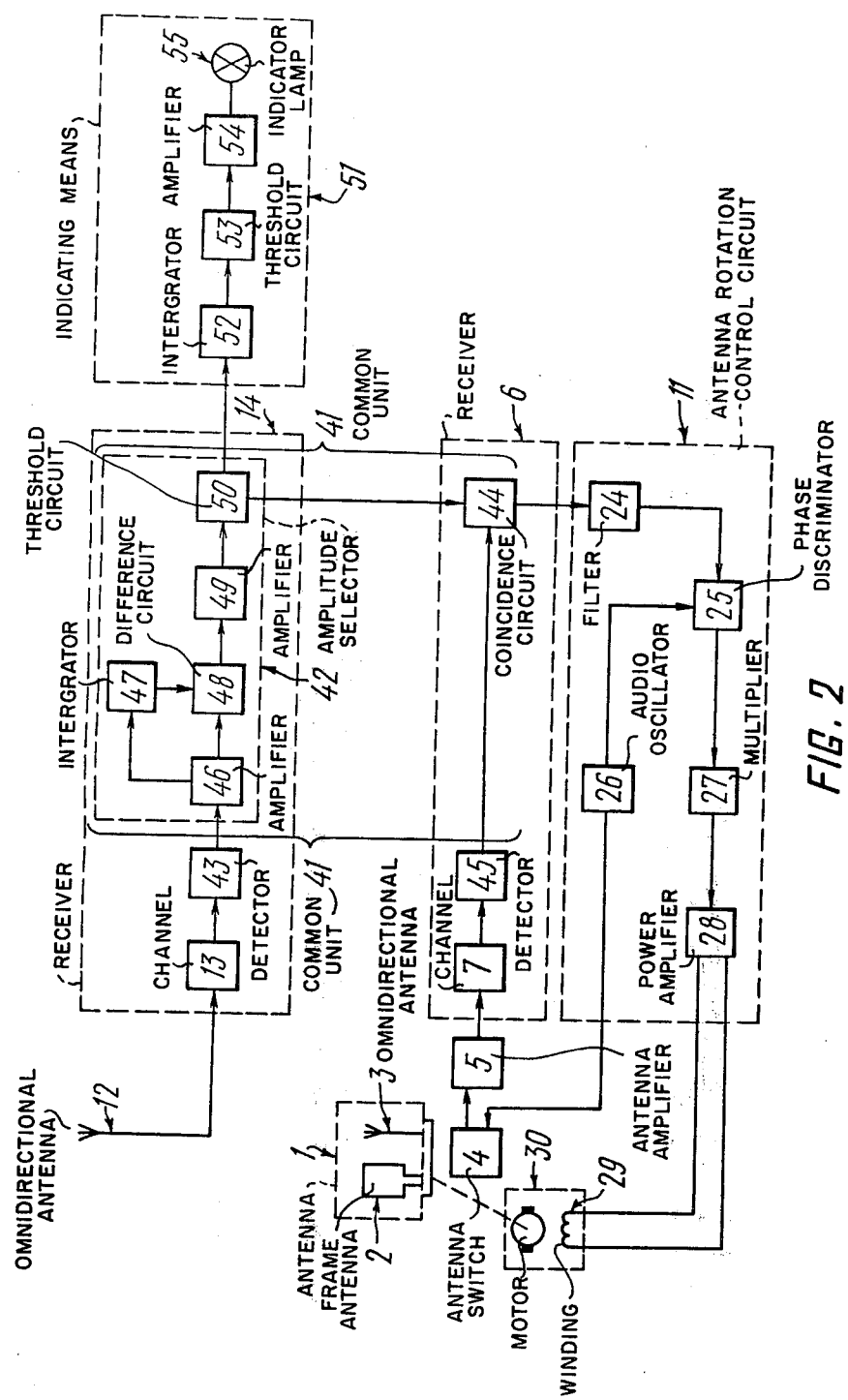
FIG. 2 is a block diagram of another embodiment of the proposed automatic radio compass with a different unit for ensuring the required noise immunity thereof, and an indicating means.

FIG. 2 shows another embodiment of the automatic radio compass comprising a different unit 41 for ensuring the required noise immunity of the receivers when the signal whose bearings are being taken is in the form of a train of pulses with a high frequency carrier, the recurrence frequency of these pulses being at least twice as high as that of the modulating low-frequency signal. The unit 41 comprises an amplitude selector 42 whose input is connected to the output of a detector 43 of the receiver 14 and a coincidence circuit 44 the first input whereof is connected to the output of the amplitude selector 42, while the second input thereof is connected to the output of a detector 45 of the receiver 6 whose input is connected to the output of the channel 7 of the receiver 6.

The output of the coincidence circuit 44 is coupled to the input of the circuit 11 for controlling the rotation of the antenna 1, arranged like the one described above.

The amplitude selector 42 includes an amplifier 46 for amplifying the train of pulses together with noise, which amplifier uses a conventional circuit and whose input is the input of the amplitude selector 42. The latter also includes an integrator 47, using a known storage circuit, whose input has connected thereto the first output of the amplifier 46, the second output whereof is connected to the first input of a circuit 48 for producing a difference signal and arranged in a conventional manner. The second input of the latter circuit has connected thereto the output of the integrator 47, while its output is connected to an amplifier 49 which comprises a conventional circuit. The input of a threshold circuit 50 is coupled to the output of the amplifier 49, the first output of the circuit 50 being the output of the amplitude selector 42, which is connected to the first input of the coincidence circuit 44.

The second output of the threshold circuit 50 is coupled to an indicating means 51 which, in the embodiment under consideration, comprises a series circuit including an integrator , a known threshold circuit 53, an amplifier 54 and an indicator lamp 55.

Consider now the operation of the proposed automatic radio compass.

The signal whose bearings are to be taken and which is received by the antennas 1 (FIG. 1) and 12 may be, depending on the type of its source, either in the form of a continuous very-high-frequency or ultrahigh-frequency signal modulated with an audio frequency signal (1000 Hz), or in the form of a train of pulses with a very-high or ultrahigh frequency carrier. Accordingly, the automatic radio compass of the present invention may operate in two modes, namely either the continuous signal bearing or the pulsed signal bearing.

Now follows a detailed description of the operation of the automatic radio compass in the first case, i.e. when bearings are taken of a continuous signal.

This signal is received simultaneously by both antennas 1 and 12, wherewith the signal is additionally modulated in the first antenna 1 with a low-frequency (30

Hz) signal fed to the antenna switch 4 from the audio oscillator 26, the frequency of the modulating signal being equal to the radiation pattern reversal frequency. The modulation is effected by 180° reversing the radiation pattern of the antenna 1, the radiation pattern having two equisignal reception direction in the course of the reversal.

The depth of this amplitude modulation with the low-frequency signal whose frequency is equal to the radiation pattern reversal frequency depends on the angle between the equisignal reception direction and the bearing to the source of the signal whose bearings are being taken.

From the antenna 12, the signal is applied to the input of the channel 13 of the receiver 14 wherein it is transformed and amplified, while from the antenna 1, the signal is applied to the channel 7 to be transformed and amplified therein, via the antenna amplifier 5 in which wide-band amplification of the signal takes place. Applied to the inputs of the mixers 8 and 13 is a signal of the first intermediate frequency, wherein it is mixed with a signal whose frequency is equal to that of the controlled local oscillator 22, and the resulting signal of the second intermediate frequency is applied to the inputs of the narrow-band filters 9 and 17. The narrow-band filters 9 and 17 have a resonant frequency and a pass-band which is no less than twice the frequency of the modulating low-frequency signal (no less than 60 Hz). Continuously, in the course of the reception by the antennas 1 and 12 of the signal whose bearings are being taken, the sawtooth signal from the output of the unit 21 varies the frequency of the controlled local oscillator 22 stepwise within preset limits, varying thereby the second intermediate frequency of the signal at the outputs of the mixers 8 and 13. As soon as the frequency of this signal falls within the pass-band of the filter 17, a signal appears at the first input thereof which is applied to the input of the amplitude detector 18 wherein it is converted into a constant voltage impressed to the input of the circuit 20 for stopping the unit 21 controlling the frequency of the local oscillator 22. Under the effect of this constant voltage (if it exceeds the threshold of response of the stop circuit 20), the voltage at the output of the control unit 21 is fixed thereby fixing the frequency of the controlled local oscillator within one step.

Fine tuning of the frequency of the controlled local oscillator 22 within the limits of one step is effected with the aid of the frequency discriminator 19, the constant voltage at the output whereof, applied to the first control input of the controlled local oscillator 22, is proportional to the difference between the frequency of the signal from the output of the narrow-band filter 17 and the resonant frequency of the latter. At the same time, the signal from the output of the mixer 8 passes through the narrow-band filter 9 to the input of the detector 10 which produces modulating signals. Then, these signals are applied to the input of the circuit 11 for controlling the rotation of the antenna 1, the filter 24 whereof separates the first harmonic of the modulating low-frequency signal whose frequency is equal to the changeover frequency. At the output of the phase discriminator 25 there appears a signal whose amplitude is proportional to the depth of modulation of the signal whose bearings are being taken with the low-frequency signal, the phase of this signal corresponding to the source of the signal whose bearings are being taken with respect to the equisignal reception direction.

This signal then passes through the multiplier 27 and the power amplifier 28 in which there is produced a control signal applied to the excitation winding of the motor 30 of the antenna 1, which motor rotates the antenna 1 in the required direction until the equisignal reception direction coincides with the bearing to the source of the signal whose bearings are being taken.

It should be noted that the time of response of the antenna rotation control circuit 11 imposes a limitation upon the duration of radiation of the continuous signal whose bearings are being taken: the automatic radio compass takes bearings of only those continuous high-frequency signals, the duration of radiation whereof is at least equal to the time of response of the circuit 11 for controlling the rotation of the antenna 1.

Once the signal whose bearings are to be taken has been detected, it is kept visually displayed with the aid of the display means 31.

An intermediate frequency signal is then applied to the input of the detector 16, from the output whereof the modulating audio-frequency signal is fed to the amplifier 32 in which the detected signal is amplified together with noise. Thereafter, this signal passes through the filter 33 in which it is separated from the noise. At the same time, a constant voltage is accumulated at the output of the integrator 34, which is proportional to the average noise level. A differential signal is obtained in the circuit 35, which is intended to produce the difference between the constant voltage at the output of the integrator 34 and the signal at the output of the filter 33, and is applied via the amplifier 36 to the second integrator 37, at the output whereof there is accumulated a constant voltage proportional to the level of the amplified differential signal from the output of the circuit 35. When this constant voltage exceeds the threshold of response of the circuit 38, the latter sends a signal via the amplifier 39, which signal triggers the luminous display 40, this being indicative of the presence of the continuous modulated high-frequency signal whose bearings are to be taken at the input of the automatic radio compass.

Consider now the operation of the automatic radio compass when it takes bearings of a pulsed signal.

The operating principle of the automatic radio compass shown in FIG. 2 differs from that of its embodiment shown in FIG. 1 in that having passed through the channels 7 and 13 to be transformed and amplified, the train of pulses recurring with high frequency is further applied to the inputs of the detectors 45 and 43, respectively, in which the train of pulses is separated from the intermediate frequency.

This train of pulses is applied, together with noise, from the output of the detector 43 to the input of the amplifier 46, from one output whereof it is further applied to the input of the integrator 47 and from the other output, to the first input of the difference producing circuit 48. At the same time, a constant voltage is accumulated at the output of the integrator 47, which is proportional to the average noise level and applied to the second input of the difference producing circuit 48. From the output of the circuit 48, the difference between the train of pulses together with noise and the constant voltage is applied to the input of the amplifier 49, from the output whereof the amplified differential signal is applied to the input of the threshold circuit 50 which produces pulses at the instant the differential signal exceeds the threshold of response of the circuit 50. From the output of the detector 45, the train of pulses together with noise is applied to the second input of the coincidence circuit 44, the first input whereof receives pulses from the first output of the threshold circuit 50, while its output produces pulses as soon as both inputs of the coincidence circuit 44 receive signals.

As a result, applied to the input of the antenna rotation control circuit 11 is only that train of pulses which corresponds to the signal whose bearings are being taken, and the coincidence circuit 44 is immune to noise.

Further operation of the automatic radio compass is similar to that of the above-described embodiment shown in FIG. 1.

In this case, too, the signal whose bearings are being taken is visually displayed with the aid of the display means 51.

From the second output of the threshold circuit 50, the pulses are applied to the input of the integrator 52, at the output whereof a constant voltage is accumulated which is porportional to the average level of the train of pulses of a particular duration corresponding to the duration of radiation of the signal whose bearings are being taken, the latter duration characterizing the source of that signal. The threshold circuit 53 operates only when said constant voltage is of the above value, and as it operates, the circuit switches on, via the amplifier 34, the luminous display 55, which is indicative of the presence of a train of pulses recurring with high frequency at the input of the automatic radio compass.

The proposed automatic radio compass can be advantageously used as a means for directing sea- and aircraft to beacons operating in pulsed as well as continuous radiation mode; it can also be used as a means for searching and rescuing objects supplied with a signal transmitting means.

The employment of the proposed radio compass permits a substantial reduction in search time and makes it possible to use as sources of signals whose bearings are taken inexpensive, beacons which trains of pulses recurring with high frequency.

This is achieved by using in conjunction with the receivers 6 and 14 a common unit 41 which ensures effective noise immunity thereof by optimizing the process of taking bearings of the received signal.

In addition, the use of the additional antenna 12 and receiver 14 permits visual display of the signal whose bearings are being taken.

What is claimed is:
1. An automatic radio compass comprising: a first directional antenna, the radiation pattern whereof being reversible through 180° and having two equisignal reception directions in the process of the changeover, said first antenna being intended for the reception and amplitude with a low-frequency switching signal of the signal whose bearings are being taken and which is a high-frequency signal modulated with an audio-frequency signal, the depth of said amplitude modulation being dependent on the angle between said equisignal reception direction and the bearing to the source of the signal whose bearings are being taken; a second antenna, the effective length whereof is at least 25 times as great as that of said first atenna; a first receiver; said first receiver having a channel wherein said signal whose bearings are being taken is shaped and amplified, the input of said channel being electrically connected to said first antenna; a second receiver; said second receiver having a channel in which said signal whose bearings are being taken is shaped and amplified, the input of said channel being electrically connected to said second antenna; a detector of said first receiver, producing said modulating signals; a detector of said second receiver, producing said modulating audio-frequency signal; a circuit controlling the rotation of said first antenna, which circuit produces a control signal corresponding to the amplitude and phase of said modulating low-frequency switching signal and is intended to control the rotation of said first antenna by turning it until said equisignal reception direction coincides with the bearing to said source of the signal whose bearings are being taken, the input of said circuit being electrically connected to the output of said detector of said first receiver; an indicator means, the input whereof is connected to the output of said second receiver; and a unit connected to both said first and second receivers, ensuring their noise immunity wherein said unit is capable of ensuring the required noise immunity in the case when said signal whose bearings are being taken in a continuous modulated high frequency signal, the duration of radiation whereof is at least equal to the time of response of said first antenna rotation control circuit, which unit comprises: a controlled local oscillator having two control inputs and two outputs; a first mixer, the first input whereof is connected to the output of said channel of the second receiver and the second input is connected to said first input of said controlled local oscillator; a second mixer, the first input whereof is connected to the output of said channel of the first receiver and the second input is connected to said second output of said controlled local oscillator; a first narrow-band filter with an input and two outputs, having a resonant frequency and a pass-band which is at least twice as high as the frequency of said modulating low-frequency signal, the input of said first narrow-band filter being connected to the output of said first mixer; a second narrow-band filter having a resonant frequency and a pass-band which is at least twice as high as the frequency of said modulating low-frequency signal, the input of said second narrow-band filter being connected to the output of said second mixer and the output thereof being connected to the input of said detector of the first receiver; an amplitude detector converting the signal from the output of said first narrow-band filter into a d-c voltage, the input of said detector being connected to the first output of said first narrow-band filter; a frequency discriminator tuned to the resonant frequency of the first filter and converting the difference between the frequency of the signal from the output of said first filter and the resonant frequency of said first filter into a d-c voltage, the input of said frequency discriminator being connected to the second output of said first narrow-band filter and the output being connected to said first control input of said controlled local oscillator; a local oscillator frequency control unit varying said frequency stepwise within preset limits the output of said unit being connected to said second control input of said controlled local oscillator; and a circuit stopping said local oscillator frequency control unit, the input of said circuit being connected to the output of said amplitude detector and the output being connected to the input of said local oscillator frequency control unit, said circuit fixing the voltage at the output of said local oscillator frequency control unit at the moment of arrival of a signal from the output of said amplitude detector.

2. An automatic radio compass comprising: a first directional antenna, the radiation pattern whereof being reversible through 180° and having two equisignal reception directions in the process of the changeover, said first antenna being intended for the reception and amplitude modulation with a low-frequency switching signal of the signal whose bearings are being taken and which is a high-frequency signal modulated with an audio-frequency signal, the depth of said amplitude modulation being dependent on the angle between said equisignal reception direction and the bearing to the source of the signal whose bearings are being taken; a second antenna, the effective length whereof is at least 25 times as great as that of said first antenna; a first receiver; said first receiver having a channel wherein said signal whose bearings are being taken is shaped and amplified, the input of said channel being electrically connected to said first antenna; a second receiver; said second receiver having a channel in which said signal whose bearings are being taken is shaped and amplified, the input of said channel being electrically connected to said second antenna; a detector of said first receiver, producing said modulating signals; a detector of said second receiver, producing said modulating audio-frequency signal; a circuit controlling the rotation of said first antenna, which circuit produces a control signal corresponding to the amplitude and phase of said modulating low-frequency switching signal and is intended to control the rotation of said first antenna by turning it until said equisignal reception direction coincides with the bearing to said source of the signal whose bearings are being taken, the input of said circuit being electrically connected to the output of said detector of said first receiver; an indicator means, the input whereof is connected to the output of said second receiver; and a unit connected to both said first and second receivers, ensuring their noise immunity wherein said unit is capable of ensuring the required noise immunity in the case when said signal whose bearings are being taken is a train of pulses recurring with a high carrier frequency, the recurrence frequency of said pulses being at least twice as high as the frequency of said modulating low-frequency signal, said unit comprising: an amplitude selector; a coincidence circuit having a first and a second inputs and an output, the first input being connected to the output of said detector of the first receiver and the output being connected to the input of said first antenna rotation control circuit; a first amplifier of said amplitude selector, which amplifies said train of pulses together with noises and has a first and a second outputs and an input connected to the outputs of said detector of the second receiver; an integrator accumulating, at its output, a d-c voltage proportional to the average noise level, the input of said integrator being connected to said first input of said first amplifier; a signal difference producing circuit having a first and a second inputs and an output, the first input having connected thereto the output of said integrator and the second input having connected thereto the second output of said first amplifier; a second amplifier, the input whereof is connected to the output of said signal difference producing circuit; and a threshold circuit, the input whereof is connected to the output of said second amplifier and the output is connected to the second input of said coincidence circuit.

3. An automatic radio compass as claimed in claim 1, provided with said indicator means comprising: a first amplifier, the input whereof is connected to the output of said detector of the second receiver and which amplifies said modulating audio-frequency signal together with noise; a filter having a pass-band which ensures the passage of said audio-frequency signal, the input of said filter being connected to the output of said first amplifier; a first integrator accumulating, at its output, a d-c voltage proportional to the average noise level, the input of said first integrator being connected to the output of said first amplifier; a circuit producing a difference between the d-c voltage at the output of said first integrator and the signal from the output of said filter, said circuit having a first and a second inputs and an output, the first input having connected thereto the output of said first integrator and the second input having connected thereto the output of said filter; a second amplifier, the input whereof is connected to the output of said difference producing circuit; a second integrator accumulating, at its output, a d-c voltage proportional to the level of the signal at the output of said second amplifier, the input of said second integrator being connected to the output of said second amplifier; and a threshold circuit, the input whereof is connected to the output of said second integrator, lighting an indicator lamp at the moment when the d-c voltage at the output of said second integrator exceeds the threshold voltage level, which is indicative of the presence of a signal whose bearings are to be taken at the input of the automatic radio compass.

* * * * *

UNITED STATES PATENT AND TRADEMARK OFFICE
CERTIFICATE OF CORRECTION

PATENT NO. : 4,023,177
DATED : May 10, 1977
INVENTOR(S) : Aron B. Bakhman, et al It is certified that error appears in the above-identified patent and that said Letters Patent are hereby corrected as shown below:

Column 10, line 31
    delete "first input"
    insert -first output-

Column 12, line 3
    delete "input"
    insert --output--

Signed and Sealed this

Thirteenth Day of September 197

[SEAL]

Attest:

RUTH C. MASON
*Attesting Officer*

LUTRELLE F. PARKER
*Acting Commissioner of Patents and Trademark*